United States Patent Office 3,332,795
Patented July 25, 1967

3,332,795
STARCH SIZE COMPOSITION
William C. Black and Carlton N. Owen, Cedar Rapids, Iowa, assignors to Penick & Ford, Ltd., Inc., Cedar Rapids, Iowa, a corporation of Delaware
No Drawing. Filed Dec. 17, 1963, Ser. No. 331,320
6 Claims. (Cl. 106—210)

This invention relates to a starch size composition, and, more particularly, to starch size compositions having a reduced tendency toward retrogradation and gelling.

For many years starches have been used as sizes for modifying the properties of paper sheets, textile yarns, and cloths, both during and subsequent to the manufacture thereof. One problem of long standing with respect to such starch sizes relates to the tendency of the starch when prepared as a cooked suspension or paste to undergo a molecular association or reassociation. Such molecular reassociation takes place on cooling or aging of the gelatinized starch dispersion, and is evidenced first by so-called "set back" which is an abnormal increase in viscosity, or, in a more advanced stage is referred to as "gelling," which is evidenced by the formation of a gel structure which may range from a soft clabbery gel to a firm rigid one. The reassociation may progress to the point where the starch forms a precipitate, which can be resolubilized only with great difficulty. This extreme stage is termed "retrogradation." While viscosity increase and gelling may be desirable in connection with starch-containing food products, such as cornstarch puddings, the tendency of most starches to undergo appreciable reassociation after they are cooked or hydrated, constitutes a difficult and vexatious problem in the use of starches for sizing purposes. Where the viscosity of the starch paste is increased beyond a certain limit, or where the starch is gelled, it may be impossible to utilize or apply the starch for the sizing of paper or textiles, and the starch may actually gel or precipitate to an insoluble form.

The problem of molecular reassociation is further aggravated when the starch is subjected to partial depolymerization, as is commonly done for modifying the solids/viscosity relationship so that the viscosity of the cooked paste is reduced below that of the native starch. Such depolymerization is customarily done by treatment with acid, by treatment with alpha-amylase or starch-thinning enzymes, or by treatment with an oxidizing agent. Unfortunately, for the most cereal and root starches, such depolymerization treatments increase the tendency of the cooked starch to undergo viscosity increase on aging and gelling. This increased tendency may be a serious limitation in the selection and use of the depolymerized starch. Where the tendency toward viscosity increase on aging or cooling is too great, or if the starch paste tends to gel on aging or cooling, the usual remedy is to select the still thinner or more highly modified starch which shows this thickening or gelling tendency to a lesser degree. However, these thinner starches are more highly depolymerized, and consequently, are less effective as regards the strength and surface improvements imparted to the paper or textile on which they are used.

Another aspect of this problem is that the starch size must be prepared in advance of use, and stored for periods of time up to several days, depending on mill use rates and conditions. Even though a prepared size may have the necessary viscosity and flow properties at the use temperature, the tendency to thicken unduly or gel when cooled or aged in storage tanks, pumps and piping, may make its use difficult or impossible. Similarly, such a gelling tendency may greatly impair the necessary circulation of the starch in size tubs, recirculating tanks, and the like, with the consequent non-uniformity of the size resulting in an undesirable variation in the sized paper or textile products.

A closely related problem is encountered in the use of starch for laundering purposes where it is desired to distribute the gelatinized starch in liquid form. The storage period of the cooked starch suspension prior to use, for example in a home laundry application, may be lengthy, and any substantial increase in viscosity or gelling of the starch suspension may make its removal from the container (or subsequent dilution to the use concentration) difficult or impossible.

In view of the seriousness of the problem of starch retrogradation and gelling for starch size applications, as has been summarized in the foregoing discussion, there has for many years been a widespread search for additives which, when combined with starch, would reduce its tendency toward retrogradation or gelling. While some additives have been found which are fairly effective providing sufficiently high concentrations are utilized, heretofore no additives have been known which are effective in very small or "trace" concentrations, such as concentrations of 1% or less based on the weight of the starch. Since it is the starch itself which is effective for the sizing purpose, it would be desired to employ as small a proportion of a reassociation inhibiting additive as possible while at the same time effectively overcoming the tendency of the starch to set-back or gel.

It is, therefore, the principal object of the present invention to provide a starch size composition wherein the tendency of even highly-gellable starches toward molecular reassociation is substantially overcome by the incorporation of a small or "trace" amount of an additive. A further object is to provide starch size compositions wherein the tendency toward set-back and gelling is controlled by the incorporation of a small quantity of an additive where the starch is of the depolymerized type, such as acid-modified, enzyme-converted, or oxidized starches. Further objects and advantages will be indicated in the following detailed specification.

This invention is applicable to all cereal and root starches which exhibit a tendency toward reassociation. Most of such starches are characterized by containing a substantial proportion of amylose starch, which is characterized by linear starch chains. Some starches, in their natural, unmodified form, such as waxy maize starch and potato starch, have relatively little tendency toward set-back or gelling, while starches such as dent cornstarch are highly gellable, both in unmodified and modified forms. This invention is particularly applicable for use with starches which are readily gellable, at least at certain concentrations and temperatures, although the invention is also useful with any starches which have a substantial tendency toward molecular reassociation.

In general, all cereal starches, both modified and unmodified, can be classed as "gellable." Furthermore, for any particular starch, modified starch or starch derivative, the retrogradation or gelling properties are well known to those skilled in the art, and therefore there should be no difficulty in selecting those starches which can be used most advantageously in the starch size compositions of this invention.

This invention is based in part on the discovery that certain monoglycerides are extremely effective in minimizing the retrogradation, set-back or gelling tendency of cooked starch pastes or sizes, and that unexpectedly low levels of the additive substantially overcome these undesirable tendencies of the starch, in fact, to such an extent that otherwise unacceptable size preparations can be successfully employed.

In practicing the present invention, there is utilized a fatty acid monoglyceride additive composed essentially of $C_{16}$ and $C_{18}$ fatty acid monoglycerides. The $C_{16}$ and $C_{18}$ fatty acids are preferably saturated, specifically palmitic acid and stearic acid. The preferred glycerides of fatty acids can be designated as 1-monoglycerides, viz 1-monopalmitin and 1-monostearin. In one preferred embodiment, at least 50% by weight of the fatty acid portions of the monoglyceride additive is derived from palmitic acid, stearic acid, or mixtures thereof. Optimum results are achieved when the fatty acids contained in the monoglyceride additive comprise at least 50% by weight of stearic acid. More generally, it is preferred that the fatty acids of the monoglyceride additive comprise at least 80% by weight of the saturated $C_{16}$ and $C_{18}$ fatty acids. In this embodiment, at least 50% by weight of the fatty acids can be stearic acid.

According to the present invention, the monoglyceride additive is combined with the starch in an amount ranging from .1 up to 1% by weight of the additive on a moisture-free starch solids basis. Since "dry" granule starch as produced and sold in the starch industry typically contains about 10% moisture by weight, the moisture-free starch solids can usually be estimated with sufficient accuracy by subtracting about 10% from the measured weight of the commercial grades of starch. In some cases, however, the moisture content may be more variable, and in such cases a more accurate computation should be made to determine the moisture-free starch solids. Preferably, the amount of the additive employed will be not over .8% by weight of the starch solids, and it will usually not be desirable to employ less than .2% of the additive based on the starch solids.

Where the monoglyceride additive is in the form of a powder, as preferred, it can be conveniently mixed or dry blended with grandule starch to produce a dry mixture, which is ready for use as a starch size composition. The monoglyceride additive can also be dry blended with dry non-granular starch, such as gelatinized, drum-sized starch. However, since it is ordinarily preferred to form starch size paste from granular starch, the monoglyceride additive of the present invention is preferably mixed with a gellable starch in granule form.

The following examples will illustrate the experimental and technical basis of the present invention, as well as its practical application.

*Example 1*

A series of starch pastes were enzyme-converted using a concentration and heating cycle approximately that used for the size preparation operation in a representative paper mill. The conversions were carried out in a stainless steel beaker equipped with a mechanical stirrer and the beaker was immersed in a thermostatically controlled, electrically heated water bath. 115 gm. of a 10% moisture unmodified cornstarch was suspended in 885 gm. of water and 2.8 ml. of a 1:1000 dilution of a commercial liquid starch liquefying enzyme (P/L 1002, Paul Lewis Laboratories, Inc., Milwaukee), was added. Also added were the other additives as mentioned below. The slurry was placed in the agitated beaker with the water bath at 170° F. for 30 minutes. The paste temperature reached 168° F. in about 15 minutes. The water bath heater was then reset to 210° F. and the paste was heated for an additional 30 minutes. The beaker was then removed and 515 gm. of water added to reduce the solids to 7.6% commercial starch. This is in the solids range frequently used in commercial paper size press operations.

The thoroughly mixed diluted paste was divided into two parts, one was observed as-is and to the other was added sufficient concentrated papermakers' alum, $Al_2(SO_4)_3$, solution to lower the pH to 4.5. This was intended to simulate a paper mill use condition where alum present to complete the rosin sizing operation may be subsequently leached out of the paper by the starch sizing solution which is in contact with the paper at the size press.

The viscosity of the starch sizing solutions with and without alum, were measured with an orifice type viscometer (seconds required for 100 ml. of size to flow from a standard "Dudley" pipette, having a water effluent time of 34 seconds) at both 100° and 140° F. The sizes were then allowed to stand without agitation at 75° F., when, after thorough mixing, their viscosity was again checked. As the viscosity had increased on cooling and aging to a point beyond the effective range of a Dudley pipette, a Brookfield Syncro-Electric viscometer operating at 20 r.p.m. was used to determine the viscosities of the aged pastes.

To each size, prior to heating, was added the amount as shown of a distilled monoglyceride made from hydrogenated cottonseed oil (Myverol 18–07, Distillation Products Co., Rochester, N.Y.). The percentages are on a moist starch basis, using the original starch of 10% moisture as the reference, and are by weight.

| Number | Sat'd. Monoglyceride percent on Starch (Moist Basis) | Dudley Visc., Sec. (freshly prepared) | | | | Brookfield Visc., cp. (aged 24 hours) | |
|---|---|---|---|---|---|---|---|
| | | Size Temp. | | | | | |
| | | 140° | 140° | 100° | 100° | 76° | 76° |
| | | pH | | | | | |
| | | 7.0 | 4.5 | 7.0 | 4.5 | 7.0 | 4.5 |
| 1 | 0 | 46.5 | 47 | 60.4 | 63 | 720 | 3,700 |
| 2 | 0.25 | 47 | 49.8 | 57 | 62.4 | 240 | 500 |
| 3 | 0.50 | 51 | 52.2 | 64 | 67.2 | 200 | 350 |

The data shows that, although the hot or fresh viscosity of the enzyme-converted size is not significantly affected by the presence of the monoglyceride, its effect on the viscosity of the aged size, especially in the presence of aluminum ions and at a lowered pH, is considerable.

This was confirmed in actual paper mill trials where batches consisting of 2200 lbs. of starch in 3000 gallons of water were enzyme-converted, diluted, etc., by a procedure approximating that used above. Without the monoglyceride, the converted starch gelled sufficiently on overnight aging that it was difficult to pump from the storage tank. With but 0.25% of the same monoglymeride on the moist starch (approximately 10% moisture) added, the converted starch remained fluid so that it was easily handled, pumped and used.

*Example 2*

Another series of starch pastes were enzyme-converted in the laboratory by a procedure such as used in Example 1. In this instance, the paste contained 20% solids and the enzyme level was increased to permit a further degree of depolymerization and thinning. 200 gm. of 10% moisture unmodified cornstarch was slurried in 786.6 gm. of water and 13.4 ml. of a 1:1000 dilution of enzyme (P/L 1002, Paul Lewis Laboratories) was added. Following the conversion cycle, the pastes were allowed to cool to 135° F., where the Brookfield viscosity was checked. They were then allowed to age overnight without agitation and observed for gel formation, following which they were thoroughly agitated and checked again for viscosity.

| Sat'd Monoglyceride Percent on Starch (Moist Basis) | Brookfield Visc., cp. | | Unagitated Aged Paste |
|---|---|---|---|
| | Fresh 135° | Aged 75° | |
| 0 | 144 | 2,500 | Gelled. |
| 0.25 | 480 | 3,000 | Soft gel. |
| 0.50 | 760 | 4,000 | Fluid. |

While the increasing amounts of monoglyceride cause an increase in the viscosity of both the fresh and aged pastes, the tendency of the unagitated pastes to gel is reduced or eliminated by the additive. The monoglyceride was Myverol 18–07.

Example 3

A series of starch pastes were prepared by heating an 11% slurry of 80 fluidity acid-modified thin-boiling starch (Douglas brand XP grade, Penick and Ford, Ltd., Inc.), on a steam bath with constant agitation. The heating period was 30 minutes, with the paste temperature being 204° F. for the last 10 minutes. Viscosities were measured using a Dudley pipette for the freshly prepared paste at 140° F., and a Brookfield viscometer at 20 r.p.m. for the pastes aged overnight at 75° F. The aged pastes were thoroughly agitated immediately prior to the viscosity determination. In addition, gel strengths were measured on the unagitated aged pastes by a procedure suggested by Hjermstad (Cereal Chemistry, vol. 32, No. 3, p. 200, May 1955). This gel value represents the force required to dislodge a metal disc embedded in the gelled, aged starch paste and is expressed in force units indicated as gram-centimeters on the dynamometer of a Corn Industries Research Foundation viscometer.

Example 5

An uncooked cornstarch suspension was treated with alkaline sodium hypochlorite to produce a so-called oxidized starch having the desired reduced viscosity, and the suspension was neutralized, filtered, washed and dried by a commercially-used technique. 12.5% suspensions of this starch were heated on a steam bath with mechanical agitation to 200° F., at which temperature they were held for 15 minutes. The pastes were cooled to room temperature while being agitated and then placed in sealed bottles for aging. A saturated monoglyceride (Myverol 18–07) was added to one paste as shown.

| Monoglyceride percent on moist starch | Appearance | | |
|---|---|---|---|
| | Fresh | Aged, 24 hrs. | 21 days |
| 0 | Fluid | Gelled, no flow | |
| 0.5 | do | Fluid | Fluid. |

The second paste would be quite suitable as a liquid laundry starch, while the first is obviously unsatisfactory as it could be removed from the container and diluted for use only with considerable difficulty.

| Type of Additive | Percent Additive (on moist starch) | Dudley Visc., 140° F. (fresh) | Brookfield Visc., 75° F. (aged) | CIV Gel (Aged) |
|---|---|---|---|---|
| None | 0.0 | 45.4 | 9,300 | 140 |
| Monoglyceride from hydrogenated cottonseed oil [1] | 0.5 | 49 | 3,500 | 17 |
| Monoglyceride from cottonseed oil [2] | 0.5 | 45.4 | 7,600 | 95 |
| Monoglyceride from hydrogenated lard [3] | 0.5 | 52.6 | 4,500 | 30 |

[1] Myverol 18–07 (Distillation Products Company, Rochester).
[2] Myverol 18–85 (Distillation Products Company, Rochester).
[3] Myverol 18–00 (Distillation Products Company, Rochester).

The data illustrates the effect of several monoglycerides on the viscosity and gel strength of an aged thin-boiling cornstarch paste. It indicates that the monoglycerides made from fully saturated fats, such as Myverol 18–07 and Myverol 18–00, are more effective than those from fats containing an appreciable degree of unsaturation, such as Myverol 18–85.

Example 4

A series of starch pastes were prepared in a 10% concentration by the procedure of Example 3 above. Acid-modified thin-boiling starches having various fluidities were used and a saturated monoglyceride (Myverol 18–07, Distillation Products Industries) was added prior to cooking as shown below. Brookfield viscosities were determined at 190° F. on the freshly prepared pastes and gel strengths were determined on the pastes aged 24 hours at 75° F.

| Starch Fluidity | Percent Monoglyceride (on moist starch) | Brookfield Visc., 190° F. fresh | Gel aged |
|---|---|---|---|
| 30 | 0 | 100 | 430 |
| 30 | 0.5 | 170 | 100 |
| 40 | 0 | 80 | 400 |
| 40 | 0.25 | 120 | 190 |
| 40 | 0.50 | 150 | 120 |
| 50 | 0 | 40 | 250 |
| 50 | 0.5 | 70 | 77 |

The data indicates that while the hot viscosity of pastes of these starches in the concentrations used may be increased slightly by the addition of saturated monoglycerides, the gelling tendency on aging is markedly decreased or eliminated.

Example 6

Starch slurries of a 40 fluidity thin-boiling starch (Douglas brand, XH grade, Penick and Ford, Ltd., Inc.), were heated on a steam bath with constant agitation until the temperature reached 204° F., at which temperature they were maintained for 10 minutes. The concentration of the cooked paste was 6.7% dry substance. To each slurry prior to heating was added 0.5% on the starch basis of a distilled monoglyceride made from the fat source shown. As the pastes cooled, Dudley viscosities were determined at the temperatures shown. The gel test of the aged pastes were determined by the procedure described in Example 3. Also, the aged pastes were then thoroughly agitated and their viscosity determined with a Brookfield viscometer, using a 20 r.p.m. spindle speed.

| Fat source of Monoglyceride | Dudley visc. (sec.) | | | Aged 24 hrs. | |
|---|---|---|---|---|---|
| | 140° | 120° | 100° | CIV gel | Brookfield |
| None | 51.4 | 57.8 | 74.2 | 52 | 4,900 |
| Hydrogenated lard [1] | 56.4 | 63.4 | 77.2 | 5 | 720 |
| Hydrogenated cottonseed oil [2] | 54.6 | 60.6 | 74.0 | 0 | 540 |

[1] Myverol 18–00 (Distillation Products Co., Rochester).
[2] Myverol 18–07 (Distillation Products Co., Rochester).

Example 7

Unmodified granule cornstarch (10% moisture) is dry blended with 0.25% by weight on a moist starch basis (0.27 dry basis) of Myverol 18–07. The resulting mixture is adapted for use in preparing enzyme-converted paper and textile sizes.

In the foregoing examples, certain commercially available monoglycerides are referred to by the trade names of Myverol 18-00, Myverol 18-07, and Myverol 18-85. These products are essentially 1-monoglycerides formed from the fatty acid mixtures of natural oils and fats, the fatty acids being employed to form the monoglycerides either as they occur naturally, or after partial or complete hydrogenation. For example, Myverol 18-00 contains the fatty acids provided by fully hydrogenated lard, Myverol 18-07 utilizes the fatty acids from fully hydrogenated cottonseed oil, and Myverol 18-85 is composed of the fatty acids from unhydrogenated cottonseed oil. Representative analyses of these commercial products are set out below:

*Myverol 18-00 (hydrogenated lard)*

100% saturated $C_8$-$C_{18}$ fatty acids:

| | Percent |
|---|---|
| Stearic acid | 67 |
| Palmitic acid | 31 |
| Balance ($C_{14}$ and lower) | 2 |

I.V. not over 1.

*Myverol 18-07 (hydrogenated cottonseed oil)*

100% saturated $C_8$-$C_{18}$ fatty acid:

| | Percent |
|---|---|
| Stearic acid | 76 |
| Palmitic acid | 23 |
| Balance ($C_{14}$ and lower) | 1 |

I.V. not over 2.

*Myverol 18-85 (cottonseed oil)*

26% saturated—74% unsaturated:

| | Percent |
|---|---|
| Palmitic acid | 23 |
| Stearic acid | 2 |
| Oleic acid | 24 |
| Linoleic acid | 50 |
| Balance ($C_{14}$ and lower) | 1 |

The fatty monoglyceride may be effectively introduced either before, during or after cooking. When it is desired to add the monoglyceride after cooking, it is preferable to add it to the cooked starch paste while the paste is still hot, thereby facilitating dispersion and mixing.

While in the foregoing specification this invention has been described in relation to certain preferred embodiments thereof and many details have been set forth for the purpose of illustration, it will be apparent to those skilled in the art that the invention is susceptible to other embodiments and that some of the details set forth herein can be varied considerably without departing from the basic principles of the invention.

We claim:
1. A starch size composition, consisting essentially of a starch having a tendency toward set-back and gel in combination with from .1 to 1% by weight on a moisture-free starch solids basis of a saturated fatty acid monoglyceride selected from the group consisting of $C_{16}$ and $C_{18}$ saturated fatty acid monoglycerides.
2. As a starch size composition, a dry mixture of a gellable starch in granule form in admixture with from .1 to 1% by weight on a moisture-free starch solids basis of a fatty acid monoglyceride additive composed essentially of $C_{16}$ and $C_{18}$ saturated fatty acid 1-monoglycerides, said composition having a lesser tendency to set-back and gel than the starch therein.
3. As a starch size composition, a gellable starch in admixture with from .2 to .8% by weight on a moisture-free starch solids basis of a fatty acid monoglyceride additive composed essentially of $C_{16}$ and $C_{18}$ saturated fatty acid monoglycerides, said composition having a lesser tendency to set-back and gel than the starch therein.
4. The starch size composition of claim 3 wherein stearic acid is at least 50% by weight of the fatty acids of said monoglyceride additive.
5. As a starch size composition, a gellable starch in admixture with from .1 to 1% by weight on a moisture-free solids basis of a fatty acid monoglyceride additive wherein at least 80% by weight of the fatty acids therein are selected from the class consisting of 1-monopalmitin, 1-monostearin, and mixtures thereof.
6. A starch composition for preparing a starch paste, consisting essentially of a dry mixture of an amylose-containing starch having a tendency to set-back and gel, and in admixture therewith from .2 to .8% by weight on a moisture-free starch solids basis of a fatty acid monoglyceride additive composed essentially of saturated $C_{16}$ and $C_{18}$ fatty acid 1-monoglycerides, said monoglyceride additive being at least 50% by weight 1-monostearin.

References Cited

UNITED STATES PATENTS

| RE. 23,637 | 3/1953 | Montgomery | 117—156 XR |
| 292,269 | 1/1884 | Wattles | 106—211 |
| 2,129,919 | 9/1938 | File | 106—211 |
| 2,250,115 | 7/1941 | Mayer et al. | 106—211 XR |
| 2,427,562 | 9/1947 | Kesler et al. | 106—213 XR |
| 2,621,133 | 12/1952 | Gaver et al. | 106—210 |
| 3,085,100 | 4/1963 | Chang | 106—213 XR |

ALEXANDER H. BRODMERKEL, *Primary Examiner.*

MORRIS LIEBMAN, *Examiner.*

L. B. HAYES, *Assistant Examiner.*